Patented Nov. 24, 1931

1,833,237

UNITED STATES PATENT OFFICE

FRITZ STRAUB AND HANS MAYER, OF BASEL, SWITZERLAND, ASSIGNORS TO FIRM SOCIETY OF CHEMICAL INDUSTRY IN BASLE, OF BASEL, SWITZERLAND

DYESTUFFS CONTAINING METALS AND PROCESS OF MAKING SAME

No Drawing. Application filed March 12, 1930, Serial No. 435,355, and in Switzerland March 16, 1929.

The present invention relates to the production of new metalliferous dyestuffs. It comprises the process of making these dyestuffs, the dyestuffs themselves, and the material that has been dyed with the new dyestuffs.

It has been found that new metalliferous dyestuffs (this term including both the dyestuffs containing only one metal and those containing more than one metal) are obtained by treating the dyestuffs which derive from diazotized 5-nitro-2-amino-1-phenols and 1-amino-8-hydroxynaphthalene-monosulfonic acids of the general formula

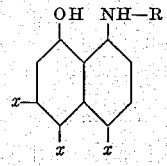

wherein two $x$'s stand for hydrogen and the third $x$ for $SO_3H$, and wherein R means hydrogen or any acyl residue, with agents yielding metal capable of forming complex compounds. Such products are among others the 1-amino-8-hydroxynaphthalene-4-sulfonic acid, 1-amino-8-hydroxynaphthalene-5-sulfonic acid, 1-amino-8-hydroxynaphthalene-6-sulfonic acid, further such as, for example, the N-acetyl-, N-benzoyl-, N-m'-nitrobenzoyl-, N-m'-amino-benzoyl, N-sulfo-aryl- etc. derivatives of these amino-hydroxynaphthalene monosulfonic acids. These dyestuffs containing metals, which may also contain several metals capable of forming complexes, such as chromium, copper, iron, manganese, cobalt, nickel, and so forth, are excellently suitable for producing fast tints on ordinary or weighted silk, above all in a neutral or fatty soap bath. This fact is surprising since the corresponding dyestuffs containing metals which derive from the 1-amino-8-hydroxynaphthalene-disulfonic acids, show in a neutral or fatty soap bath no or but litle affinity for weighted silk.

Furthermore, it has been found that equally valuable products containing metals are obtained by conducting the manufacture of the dyestuff in presence of the agents yielding metals.

The following examples illustrate the invention, the parts being by weight:—

Example 1

4.04 parts of the dyestuff of the formula

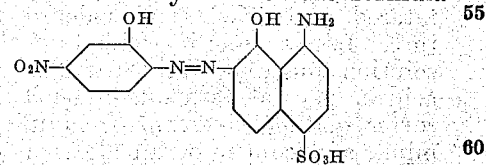

obtained by coupling in solution alkaline with sodium carbonate diazotized 5-nitro-2-amino-1-phenol and 1-amino-8-hydroxynaphthalene-4-sulfonic acid are dissolved in 400 parts of water and 2 parts of ammonia, and the solution is heated to boiling for some time together with a quantity of an ammoniacal copper oxide solution corresponding with 0.7 part of copper. The whole is then neutralized with acetic acid, precipitation of the copper compound is completed by adding common salt and the dyestuff is filtered and dried at a moderate temperature. The dyestuff is soluble in water to a pure blue-green solution and dyes loaded and not loaded silk in a neutral bath uniform, pure green-blue tints of equal intensity.

When instead of 1-amino-8-hydroxynaphthalene-4-sulfonic acid there are used the 1-amino-8-hydroxynaphthalene-5- or -6-sulfonic acids or the same acids benzoylated or acetylated in the amino-group similar copper compounds are obtained which dye silk greenish-blue or reddish-blue.

Example 2

8.08 parts of the dyestuff obtained by coupling in an alkaline solution diazotized 5-nitro-2-amino-1-phenol and 1-amino-8-hydroxynaphthalene-4-sulfonic acid are dissolved in 500 parts of water. The solution is heated to boiling for 24–30 hours in a reflux apparatus with a quantity of chromium fluoride corresponding with 3.04 parts of $Cr_2O_3$. The chromium compound thus formed is then separated by means of common salt, filtered and dried at a moderate temperature. The dyestuff so obtained is soluble in water to a bluish-green solution and dyes wool in a mineral acid bath green tints, and yields on natural silk in an acetic acid or neutral bath also green tints. The corresponding chromiferous dyestuff obtained from 5-nitro-4-chloro-2-amino-1-phenol yields similar tints.

Example 3

8.08 parts of the dyestuff obtained by coupling in an alkaline solution diazotized 5-nitro-2-amino-1-phenol and 1-amino-8-hydroxynaphthalene-4-sulfonic acid are dissolved in 500 parts of water and the solution is heated to boiling in a reflux apparatus with a quantity of chromium fluoride corresponding with 1.06 parts of $Cr_2O_3$. After 24 hours, 3.25 parts of $CuSO_4.5H_2O$ are added and the liberated mineral acid is neutralized with 1.77 parts of sodium acetate, while boiling is continued for a short time. The chromium-copper compound of the dyestuff thus formed is then separated by means of common salt, filtered, and dried at a moderate temperature. It is soluble in water to a blue-green solution and dyes natural silk in an acetic acid or neutral bath blue-green tints. The corresponding dyestuffs containing chromium and copper obtained from 5-nitro-4-chloro-2-amino-1-phenol yield similar shades. Similar products are obtained by simultaneously causing chromium and copper compounds to react on the azo-dyestuffs.

Example 4

5.08 parts of the dyestuff of the formula

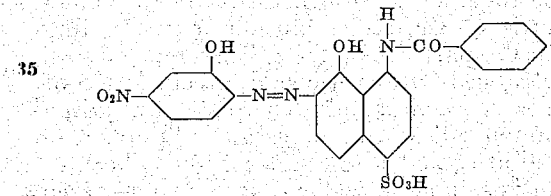

obtained by coupling in an alkaline solution diazotized 5-nitro-2-amino-1-phenol and 1-(benzoylamino)-8-hydroxy-naphthalene-4-sulfonic acid are dissolved in 400 parts of water and the solution is heated to boiling for 24–30 hours in a reflux apparatus with 20 parts of a chromium fluoride solution corresponding with 1.52 parts of $Cr_2O_3$. The chromium compound thus formed is then separated by means of common salt, filtered and dried at a moderate temperature. It is soluble in water to a grey-blue solution and dyes natural silk in an acetic acid or neutral bath reddish-grey tints.

Example 5

4.46 parts of the dyestuff of the formula

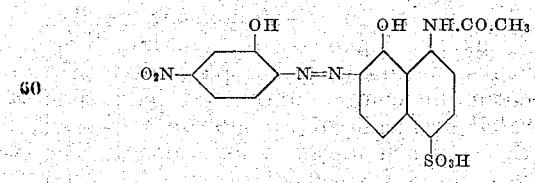

obtained by coupling in an alkaline solution diazotized 5-nitro-2-amino-1-phenol and 1-acetylamino-8-hydroxy-naphthalene-4-sulfonic acid are dissolved in 400 parts of water. The solution is heated to boiling and mixed with 2.5 parts of crystallized copper sulfate and 1.4 parts of crystallized sodium acetate, boiling being continued for a short time. The copper compound thus obtained is then salted out, filtered and dried. It dyes natural silk in an acetic acid or neutral bath reddish-blue tints.

Example 6

8.77 parts of the dyestuff of the formula

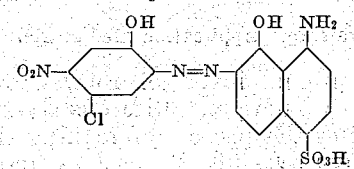

obtained by coupling in an alkaline solution diazotized 5-nitro-4-chloro-2-amino-1-phenol and 1-amino-8-hydroxy-naphthalene-4-sulfonic acid are dissolved in 400 parts of water and 5 parts of ammonia and boiling of the solution is maintained for some time while adding thereto a quantity of an ammoniacal copper solution obtained from 5 parts of crystallized copper sulfate and 7 parts of ammonia. The copper compound thus formed is salted out, filtered and dried. It dyes natural silk in an acetic acid or neutral bath greenish-blue tints.

Example 7

8.08 parts of the dyestuff obtained by coupling in an alkaline solution diazotized 5-nitro-2-amino-1-phenol and 1-amino-8-hydroxy-naphthalene-4-sulfonic acid are dissolved in 500 parts of water and heated to boiling for a short time in a reflux apparatus with 5.5 parts of crystallized nickel sulfate and 4 parts of crystallized sodium acetate. The nickel compound of the dyestuff thus formed is then separated by addition of common salt, filtered and dried. It dyes natural silk in a neutral bath green-blue tints.

Example 8

23.9 parts of 1-amino-8-hydroxynaphthalene-4-sulfonic acid are dissolved in 400 parts of water and 30 parts of calcined sodium carbonate, whereupon the solution is coupled for some hours at 5–15° C. under addition of 25 parts of crystallized copper sulfate with the diazo-compound obtained in the usual manner from 15 parts of 5-nitro-2-amino-1-phenol. When coupling is complete, the whole is heated for a short time and neutralized with acetic acid, whereby the copper compound of the dyestuff thus formed is almost entirely precipitated. Before heating the solution may also be made feebly acid by means of acetic acid or mineral acid and then to proceed with the completion of the complex formation in an acid medium. The separated dyestuff is filtered off and dried at a moderate temperature. It dissolves in soda to a reddish-blue and in water to a greenish-blue solution, dyeing natural silk in an acetic acid or neutral bath green-blue tints.

If, for example, nickel or mixtures of copper and nickel are used instead of copper, the corresponding nickel or copper-nickel compounds are obtained, respectively.

Furthermore, the coupling may also be conducted in an ammoniacal or caustic alkaline medium.

What we claim is:—

1. Process for the manufacture of metalliferous dyestuffs which consists in treating the azo-dyestuffs obtained by alkaline coupling diazotized 5-nitro-2-amino-1-phenols and 1-amino-8-hydroxynaphthalene-monosulfonic acids of the general formula

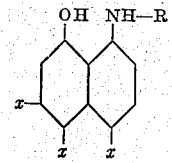

wherein two $x$'s stand for hydrogen and the third $x$ for $SO_3H$, and wherein R means hydrogen or an acyl residue, with agents yielding metals capable of forming complex compounds with the azo-dyestuffs.

2. Process for the manufacture of metalliferous dyestuffs which consists in treating the azo-dyestuffs obtained by alkaline coupling diazotized 5-nitro-2-amino-1-phenols and 1-amino-8-hydroxynaphthalene-monosulfonic acids of the general formula

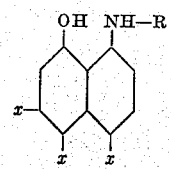

wherein two $x$'s stand for hydrogen and the third $x$ for $SO_3H$, and wherein R means hydrogen or an acyl residue, with agents yielding metals of the atomic weight between 52 and 64.

3. Process for the manufacture of metalliferous dyestuffs which consists in treating the azo-dystuffs obtained by alkaline coupling diazotized 5-nitro-2-amino-1-phenols and 1-amino-8-hydroxynaphthalene-monosulfonic acids of the general formula

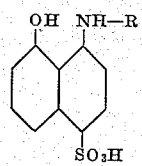

wherein R means hydrogen or an acyl residue, with agents yielding metals of the atomic weight between 52 and 64.

4. Process for the manufacture of metalliferous dyestuffs which consists in treating the azo-dyestuff obtained by alkaline coupling diazotized 5-nitro-2-amino-1-phenol and 1-amino-8-hydroxynaphthalene-monosulfonic acid of the formula

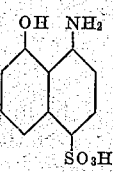

with agents yielding metals of the atomic weight between 52 and 64.

5. Process for the manufacture of metalliferous dyestuffs, which consists in treating the azo-dyestuff obtained by alkaline coupling diazotized 5-nitro-2-amino-1-phenol and 1-amino-8-hydroxynaphthalene-monosulfonic acid of the formula

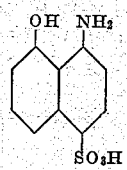

with agents yielding chromium and copper.

6. Process for the manufacture of metalliferous dyestuffs, which consists in treating the azo-dyestuff obtained by alkaline coupling diazotized 5-nitro-2-amino-1-phenol and 1-amino-8-hydroxynaphthalene-monosulfonic acid of the formula

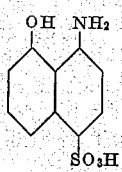

with agents yielding copper.

7. As new products the metalliferous dyestuffs which contain complex bound metals, which dyestuffs correspond to the azo-dyestuffs of the general formula

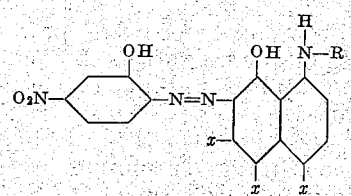

wherein the 5-nitrophenolic nucleus may be further substituted by halogen, wherein two $x$'s stand for hydrogen and the third $x$ for $SO_3H$, and wherein R means hydrogen or any acyl residue, and which products form dark powders which dye ordinary or weighted silk from a neutral or fatty soap bath reddish-grey, red-blue to green-blue and green tints.

8. As new products the metalliferous dyestuffs containing metals of the atomic weight between 52 and 64 which dyestuffs correspond to the azo-dyestuffs of the general formula

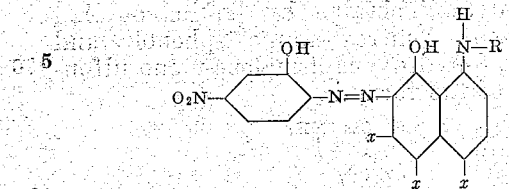

wherein the 5-nitrophenolic nucleus may be further substituted by halogen, wherein two $x$'s stand for hydrogen and the third $x$ for $SO_3H$, and wherein R means hydrogen or an acyl residue, and which products form dark powders which dye ordinary or weighted silk from a neutral or fatty soap bath reddish-grey, red-blue to green-blue and green tints.

9. As new products the metalliferous dyestuffs containing metals of the atomic weight between 52 and 64 which dyestuffs correspond to the azo-dyestuffs of the general formula

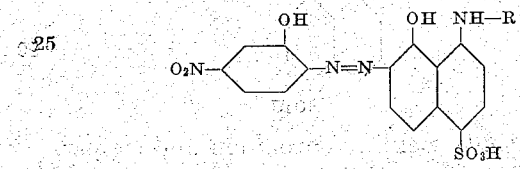

wherein the 5-nitrophenolic nucleus may be further substituted by halogen and wherein R means hydrogen or an acyl residue, and which products form dark powders which dye ordinary or weighted silk from a neutral or fatty soap bath reddish-grey, red-blue to green-blue and green tints.

10. As new products the metalliferous dyestuffs containing metals of the atomic weight between 52 and 64 which dyestuffs correspond to the azo-dyestuff of the formula

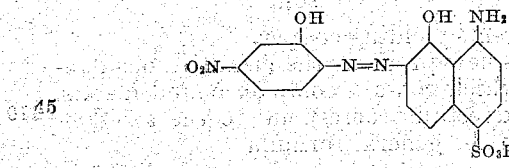

and which products form dark powders which dye ordinary or weighted silk from a neutral or fatty soap bath red-blue to green-blue and green tints.

11. As new products the metalliferous dyestuffs containing chromium and copper, which dyestuffs correspond to the azo-dyestuff of the formula

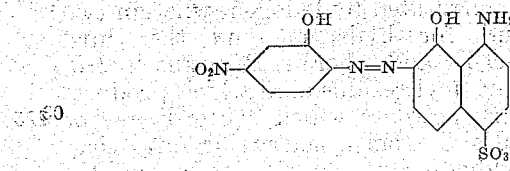

and which products form dark powders which dye ordinary or weighted silk from a neutral or fatty soap bath green-blue and green tints.

12. As a new product the metalliferous dyestuff containing copper which dyestuff corresponds to the azo-dyestuff of the formula

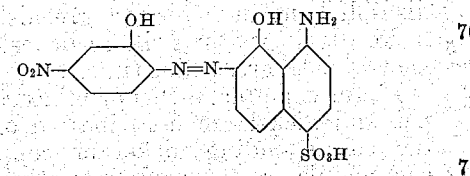

which product forms a dark powder which dyes ordinary or weighted silk from a neutral or fatty soap bath green-blue tints.

In witness whereof we have hereunto signed our names this 28th day of February, 1930.

FRITZ STRAUB.
HANS MAYER.